(12) United States Patent
Gao et al.

(10) Patent No.: US 10,591,334 B2
(45) Date of Patent: Mar. 17, 2020

(54) LIMITING A DRIVE SIGNAL

(71) Applicant: Micro Motion, Inc., Boulder, CO (US)

(72) Inventors: Fengchuan Gao, Nanjing (CN); Kai Shen, Nanjing (CN); Mei Zhang, Nanjing (CN)

(73) Assignee: Micro Motion, Inc., Boulder, CO (US)

( * ) Notice: Subject to any disclaimer, the term of this patent is extended or adjusted under 35 U.S.C. 154(b) by 31 days.

(21) Appl. No.: 16/077,908

(22) PCT Filed: Feb. 26, 2016

(86) PCT No.: PCT/CN2016/074628
§ 371 (c)(1),
(2) Date: Aug. 14, 2018

(87) PCT Pub. No.: WO2017/143579
PCT Pub. Date: Aug. 31, 2017

(65) Prior Publication Data
US 2019/0033112 A1    Jan. 31, 2019

(51) Int. Cl.
*G06F 9/44* (2018.01)
*G06F 11/00* (2006.01)
*G06F 7/00* (2006.01)
*G01F 1/84* (2006.01)
*G01F 25/00* (2006.01)
*G01F 7/00* (2006.01)

(52) U.S. Cl.
CPC .......... *G01F 1/8436* (2013.01); *G01F 1/8422* (2013.01); *G01F 1/8427* (2013.01); *G01F 1/8431* (2013.01); *G01F 1/8459* (2013.01); *G01F 25/003* (2013.01); *G01F 7/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,413,317 A | * | 11/1983 | Swenson | G06F 3/0601 710/38 |
| 5,394,527 A | * | 2/1995 | Fakhruddin | G06F 1/24 710/59 |
| 5,590,375 A | * | 12/1996 | Sangveraphunsiri | G06F 3/0601 710/21 |
| 5,661,232 A | | 8/1997 | Van Cleve et al. | |
| 5,682,310 A | * | 10/1997 | Pedneau | G06F 11/3648 710/261 |
| 8,863,574 B2 | * | 10/2014 | Kho | G01C 19/5755 73/1.37 |

(Continued)

FOREIGN PATENT DOCUMENTS

| WO | 9108447 A1 | 6/1991 |
|---|---|---|
| WO | 2006022742 A1 | 3/2006 |

(Continued)

*Primary Examiner* — Jewel V Dowtin
(74) *Attorney, Agent, or Firm* — The Ollila Law Group LLC (57) ABSTRACT

A method of limiting a drive signal is provided. The method includes providing a drive signal for a meter assembly, wherein the meter assembly has a resonance frequency. The method also includes interrupting the drive signal after a first drive time-period, wherein the first drive time-period is based on an expected time for the drive signal to reach the resonance frequency.

16 Claims, 6 Drawing Sheets

(56) References Cited

U.S. PATENT DOCUMENTS

2003/0126932 A1    7/2003   Brockhaus
2009/0007968 A1    1/2009   Knecht et al.

FOREIGN PATENT DOCUMENTS

| WO | 2006091199 A1 | 8/2006 |
|---|---|---|
| WO | 2008013545 A1 | 1/2008 |
| WO | 2008024112 A1 | 2/2008 |
| WO | 2008111983 A1 | 9/2008 |
| WO | 2009017494 A1 | 2/2009 |
| WO | 2009105096 A1 | 8/2009 |
| WO | 2009148451 A1 | 12/2009 |
| WO | 2010056244 A1 | 5/2010 |
| WO | 2013006171 A1 | 1/2013 |

* cited by examiner

LIMITING A DRIVE SIGNAL

TECHNICAL FIELD

The embodiments described below relate to vibratory sensors and, more particularly, to limiting a drive signal.

BACKGROUND

Vibrating sensors, such as for example, vibrating densitometers and Coriolis flowmeters are generally known, and are used to measure mass flow and other information related to materials flowing through a conduit in the flowmeter. Exemplary Coriolis flowmeters are disclosed in U.S. Pat. Nos. 4,109,524, 4,491,025, and Re. 31,450. These flowmeters have meter assemblies with one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode. When there is no flow through the flowmeter, a driving force applied to the conduit(s) causes all points along the conduit(s) to oscillate with identical phase or with a small "zero offset", which is a time delay measured at zero flow. The zero offset may be referred to as a meter zero.

As material begins to flow through the conduit(s), Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

A meter electronics connected to the driver generates a drive signal to operate the driver and also to determine a mass flow rate and/or other properties of a process material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired conduit amplitude and frequency. It is also known in the art to provide the pickoffs as a magnet and coil arrangement very similar to the driver arrangement.

The drive signal may be swept over a frequency range until the drive signal reaches a resonance frequency of the meter assembly. Generally, an amplitude of the drive signal provided to the meter assembly decreases when the drive signal reaches the resonance frequency. For example, the current of the drive signals may decrease. However, sometimes the drive signal does not reach the resonance frequency. As a result, the amplitude of the drive signal may remain at or near a maximum. Continuously providing the drive signal without decreasing the amplitude can cause undesirable results, such as an increase in temperature, or the like, in the meter electronics. Accordingly, there is a need to limit the drive signal.

SUMMARY

A method of limiting a drive signal is provided. According to an embodiment, the method comprises providing a drive signal for a meter assembly, wherein the meter assembly has a resonance frequency. The method also includes interrupting the drive signal after a first drive time-period, wherein the first drive time-period is based on an expected time for the drive signal to reach the resonance frequency.

A meter electronics for limiting a drive signal is provided. According to an embodiment, the meter electronics comprises a processor and one or more signal processors communicatively coupled to the processor. The one or more signal processors are configured to provide a drive signal for a meter assembly, wherein the meter assembly has a resonance frequency. The one or more signal processors are also configured to interrupt the drive signal after a first drive time-period, wherein the first drive time-period is based on an expected time for the drive signal to reach the resonance frequency.

A dual vibratory sensor system for limiting a drive signal is provided. According to an embodiment, the dual vibratory sensor system comprises a first meter assembly and a meter electronics coupled to the first meter assembly. The meter electronics is configured to provide a drive signal for the first meter assembly, wherein the first meter assembly has a resonance frequency, and interrupt the drive signal after a first drive time-period, wherein the first drive time-period is based on an expected time for the drive signal to reach the resonance frequency.

ASPECTS

According to an aspect, a method of limiting a drive signal comprises providing a drive signal for a meter assembly, wherein the meter assembly has a resonance frequency. The method also includes interrupting the drive signal after a first drive time-period, wherein the first drive time-period is based on an expected time for the drive signal to reach the resonance frequency.

Preferably, the first drive time-period is a pre-determined time-period based on the expected time for the drive signal to reach the resonance frequency.

Preferably, interrupting the drive signal comprises interrupting the drive signal with a quiescent portion.

Preferably, the method further comprises providing the drive signal for the meter assembly after the first drive time-period.

Preferably, providing the drive signal comprises sweeping a frequency of the drive signal over a range that includes the resonance frequency.

According to an aspect, a meter electronics (100) for limiting a drive signal comprises a processor (110) and one or more signal processors (120) communicatively coupled to the processor (110). The one or more signal processors (120) are configured to provide a drive signal for a meter assembly (10a, 10b), wherein the meter assembly (10a, 10b) has a resonance frequency, and interrupt the drive signal after a first drive time-period ($T_a$), wherein the first drive time-period ($T_a$) is based on an expected time for the drive signal to reach the resonance frequency.

Preferably, the first drive time-period ($T_a$) is a pre-determined time-period based on the expected time for the drive signal to reach the resonance frequency.

Preferably, the one or more signal processors (120) being configured to interrupt the drive signal comprises the one or more signal processors (120) being configured to interrupt the drive signal with a quiescent time-period ($T_b$).

Preferably, the one or more signal processors (120) are further configured to provide the drive signal for the meter assembly (10a, 10b) after the first drive time-period ($T_a$).

Preferably, the one or more signal processors (120) being configured to provide the drive signal comprises the one or more signal processors (120) being configured to sweep a frequency of the drive signal over a range that includes the resonance frequency.

According to an aspect, a dual vibratory sensor system (5) for limiting a drive signal comprises a first meter assembly (10a) and a meter electronics (100) coupled to the first meter assembly (10a). The meter electronics (100) is configured to provide a drive signal for the first meter assembly (10a), wherein the first meter assembly (10a) has a resonance frequency. The meter electronics (100) is also configured to interrupt the drive signal after a first drive time-period ($T_a$), wherein the first drive time-period ($T_a$) is based on an expected time for the drive signal to reach the resonance frequency.

Preferably, the first drive time-period ($T_a$) is a predetermined time-period based on the expected time for the drive signal to reach the resonance frequency.

Preferably, the meter electronics (100) being configured to interrupt the drive signal comprises the meter electronics (100) being configured to interrupt the drive signal with a quiescent time-period ($T_b$).

Preferably, the meter electronics (100) is further configured to provide the drive signal for the first meter assembly (10a) after the first drive time-period ($T_a$).

Preferably, the meter electronics (100) being configured to provide the drive signal comprises the meter electronics (100) being configured to sweep a frequency of the drive signal over a range that includes the resonance frequency.

Preferably, the dual vibratory sensor system (5) further comprises a second meter assembly (10b), wherein the meter electronics (100) is coupled to the second meter assembly (10b).

BRIEF DESCRIPTION OF THE DRAWINGS

The same reference number represents the same element on all drawings. It should be understood that the drawings are not necessarily to scale.

DETAILED DESCRIPTION

FIGS. 1-7 and the following description depict specific examples to teach those skilled in the art how to make and use the best mode of embodiments of limiting a drive signal. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of limiting the drive signal. As a result, the embodiments described below are not limited to the specific examples described below, but only by the claims and their equivalents.

Limiting the drive signal may include providing the drive signal for a meter assembly, which has a resonance frequency. The drive signal may or may not be provided to the meter assembly. For example, during testing, the drive signal may be provided to a resistor instead of the meter assembly. Accordingly, during testing, the drive signal may not reach the resonance frequency. However, the drive signal may be interrupted after a first drive time-period. The first drive time-period may be based on an expected time for the drive signal to reach the resonance frequency. Accordingly, for example, during normal operation where the drive signal is provided to the meter assembly, the drive signal may reach the resonance frequency of the meter assembly. In addition, by being interrupted, the temperature of the meter electronics may not exceed the temperature threshold if the drive signal does not reach the resonance frequency.

Dual Vibratory Sensor System

Figure 1:
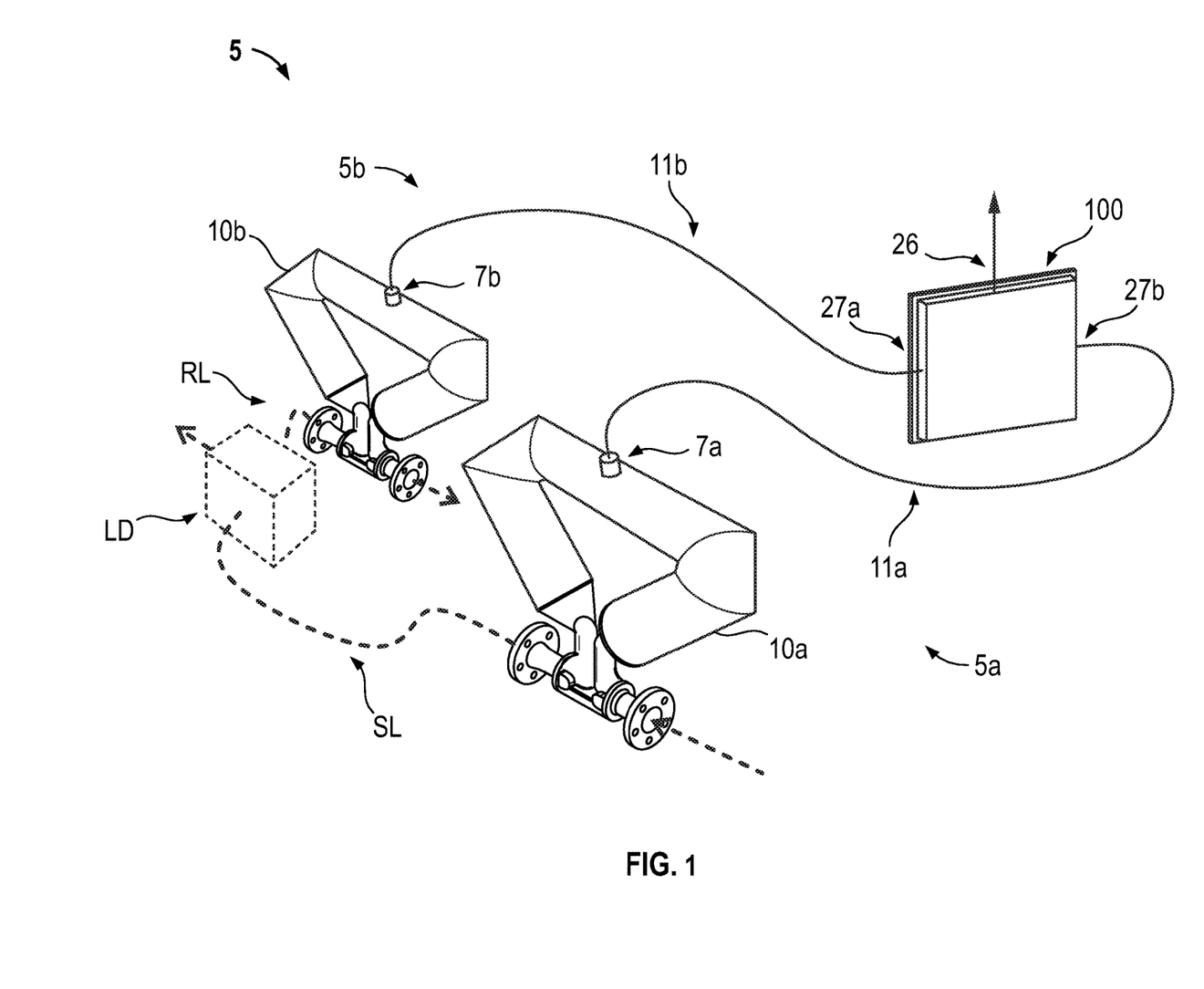
FIG. 1 shows a dual vibratory sensor system 5 for limiting a drive signal.

FIG. 1 shows a dual vibratory sensor system 5 for limiting a drive signal. As shown in FIG. 1, the dual vibratory sensor system 5 includes a first vibratory sensor 5a and a second vibratory sensor 5b. The first and second vibratory sensor 5a, 5b are respectively comprised of the meter electronics 100 and the first and second meter assembly 10a, 10b.

The meter electronics 100 is communicatively coupled to the first and second meter assembly 10a, 10b via a first and second set of leads 11a, 11b. The first and second set of leads 11a, 11b are coupled (e.g., attached, affixed, etc.) to a first and second communication port 27a, 27b on the meter electronics 100. The first and second set of leads 11a, 11b are also coupled to the first and second meter assembly 10a, 10b via a first and second communication port 7a, 7b on the first and second meter assembly 10a, 10b. The meter electronics 100 is configured to provide information over path 26 to a host. The first and second meter assembly 10a, 10b are shown with a case that surrounds flow tubes. The meter electronics 100 and first and second meter assembly 10a, 10b are described in more detail in the following with reference to FIGS. 2 and 3.

Still referring to FIG. 1, the first and second vibratory sensor 5a, 5b can be used to, for example, calculate a difference in flow rate and/or total flow between a supply line SL and a return line RL. More specifically, the dual vibratory sensor system 5 may be employed in a cryogenic application where fluid is supplied from a tank in liquid state and then return to the tank in a gaseous state. In one exemplary cryogenic application, the first meter assembly 10a may be part of the supply line SL that supplies LNG to an LNG dispenser LD and the second meter assembly 10b may be part of a return line RL from the LNG dispenser LD. The total flow through the second meter assembly 10b can be subtracted from the total flow through the first meter assembly 10a to determine the total amount of LNG supplied to the LNG vehicle. This exemplary application with the supply and return line SL, RL is shown with dashed lines to illustrate that the dual vibratory sensor system 5 can be employed in other applications. Other cryogenic fluids may be employed, such as hydrogen, or the like. As can also be appreciated, in the described and other embodiments, the calculations can be performed by the meter electronics 100, which is described in more detail in the following.

Figure 2:
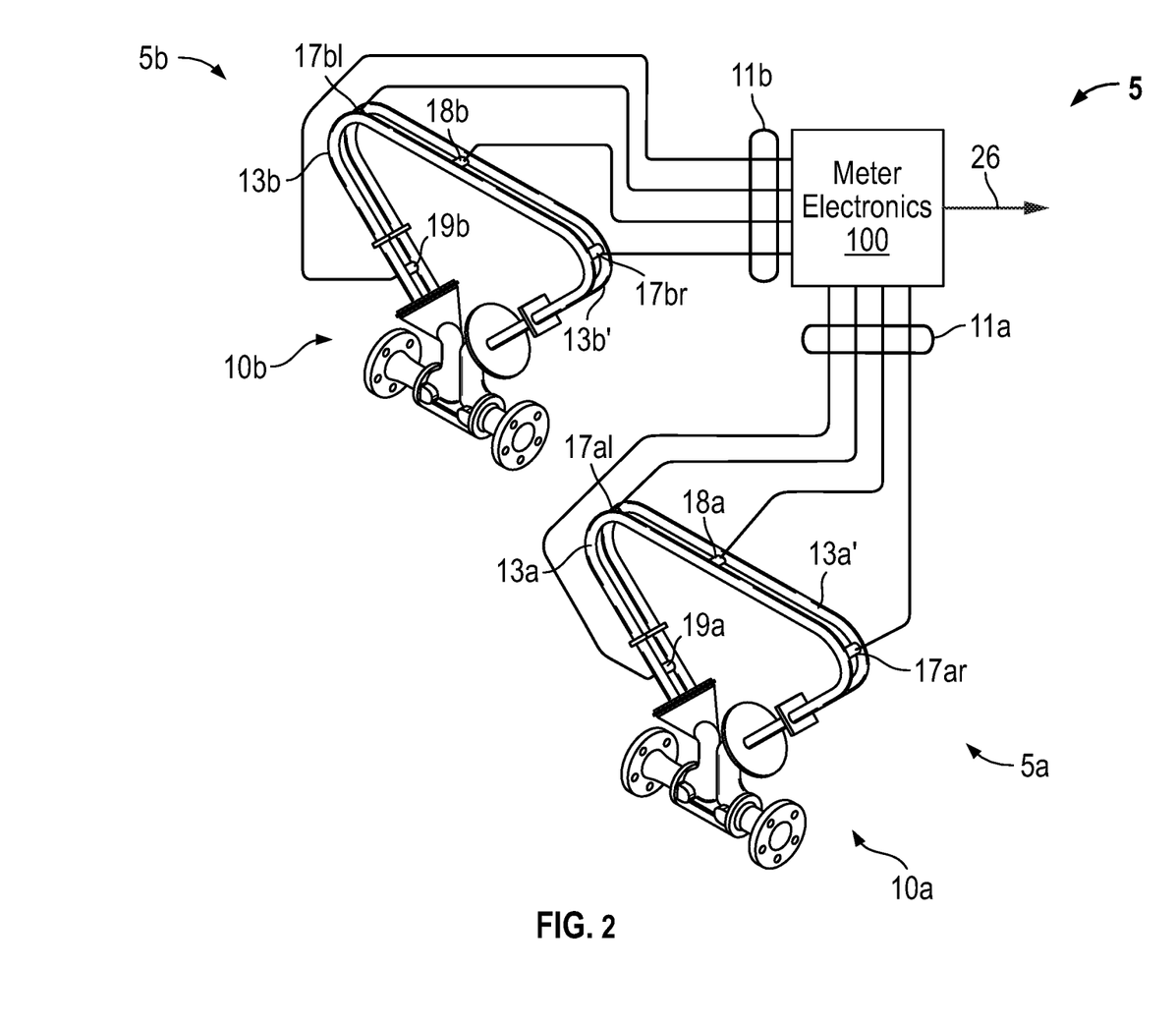
FIG. 2 shows the dual vibratory sensor system 5 for limiting a drive signal.

FIG. 2 shows the dual vibratory sensor system 5 for limiting a drive signal. As shown in FIG. 2, the dual vibratory sensor system 5 includes the first vibratory sensor 5a and the second vibratory sensor 5b described in the foregoing with reference to FIG. 1. The cases on the meter electronics 100 and first and second meter assembly 10a, 10b are not shown for clarity. The first and second meter assembly 10a, 10b respond to mass flow rate and density of a process material. The meter electronics 100 is connected to the first and second meter assembly 10a, 10b via a first and second set of leads 11a, 11b to provide density, mass flow rate, and temperature information over the path 26, as well as other information. A Coriolis flow meter structure is described although it is apparent to those skilled in the art that the present invention could be practiced with alternative flowmeters.

The first and second meter assembly 10a, 10b include a pair of parallel conduits 13a, 13a' and 13b, 13b', a first and second drive mechanism 18a, 18b, temperature sensor 19a, 19b, and pair of left and right pick-off sensors 17a1, 17ar and 17b1, 17br. Each of the pair of conduits 13a, 13a' and 13b, 13b' bend at two symmetrical locations along the conduits 13a, 13a' and 13b, 13b' length and are essentially parallel throughout their length. The conduits 13a, 13a' and 13b, 13b' are driven by the drive mechanisms 18a, 18b in opposite directions about their respective bending axes and at what is termed the first out-of-phase bending mode of the flow meter. The drive mechanisms 18a, 18b may comprise any one of many arrangements, such as a magnet mounted to the conduits 13a', 13b' and an opposing coil mounted to the conduits 13a, 13b and through which an alternating current is passed for vibrating both conduits 13a, 13a' and 13b, 13b'. A suitable drive signal is applied by the meter electronics 100 to the drive mechanisms 18a, 18b.

The first and second vibratory sensor 5a, 5b can be initially calibrated and a flow calibration factor FCF, along with a zero offset $\Delta T_0$, can be generated. In use, the flow calibration factor FCF can be multiplied by the time delay $\Delta T$ measured by the pickoffs minus the zero offset $\Delta T_0$ to generate a mass flow rate $\dot{m}$. An example of a mass flow rate equation utilizing a flow calibration factor FCF and a zero offset $\Delta T_0$ is described by Equation (1):

$$\dot{m} = FCF(\Delta T_{measured} - \Delta T_0) \quad (1)$$

Where:
  $\dot{m}$=mass flow rate
  FCF=flow calibration factor
  $\Delta T_{measured}$=measured time delay
  $\Delta T_0$=initial zero offset The temperature sensors 19a, 19b are mounted to conduits 13a', 13b' to continuously measure the temperature of the conduits 13a', 13b'. The temperature of the conduits 13a', 13b' and hence the voltage appearing across the temperature sensors 19a, 19b for a given current is governed by the temperature of the material passing through the conduits 13a', 13b'. The temperature dependent voltages appearing across the temperature sensors 19a, 19b may be used by the meter electronics 100 to compensate for the change in elastic modulus of the conduits 13a', 13b' due to any changes in conduit temperature. In the embodiment shown, the temperature sensors 19a, 19b are resistive temperature detectors (RTD). Although the embodiments described herein employ RTD sensors, other temperature sensors may be employed in alternative embodiments, such as thermistors, thermocouples, etc.

The meter electronics 100 receives the left and right sensor signals from the first and second left and right pick-off sensors 17a1, 17ar and 17b1, 17br and the temperature signals from the first and second temperature sensor 19a, 19b via the first and second set of leads 11a, 11b. The meter electronics 100 provides a drive signal to the drive mechanisms 18a, 18b and vibrates the first and second pair of conduits 13a, 13a' and 13b, 13b'. The meter electronics 100 processes the left and right sensor signals and temperature signals to compute the mass flow rate and the density of the material passing through the first and/or second meter assembly 10a, 10b. This information, along with other information, is applied by meter electronics 100 over path 26 as a signal.

As can be appreciated, although the dual vibratory sensor system 5 shown in FIGS. 1 and 2 includes only two meter assemblies 10a, 10b, the dual vibratory sensor system 5 may be employed in systems that include more than two meter assemblies. For example, a meter electronics may be configured to communicate with three or more meter assemblies. In such a configuration, the dual vibratory sensor system 5 may be a portion of the meter electronics and two of the three or more meter assemblies.

Meter Electronics

Figure 3:
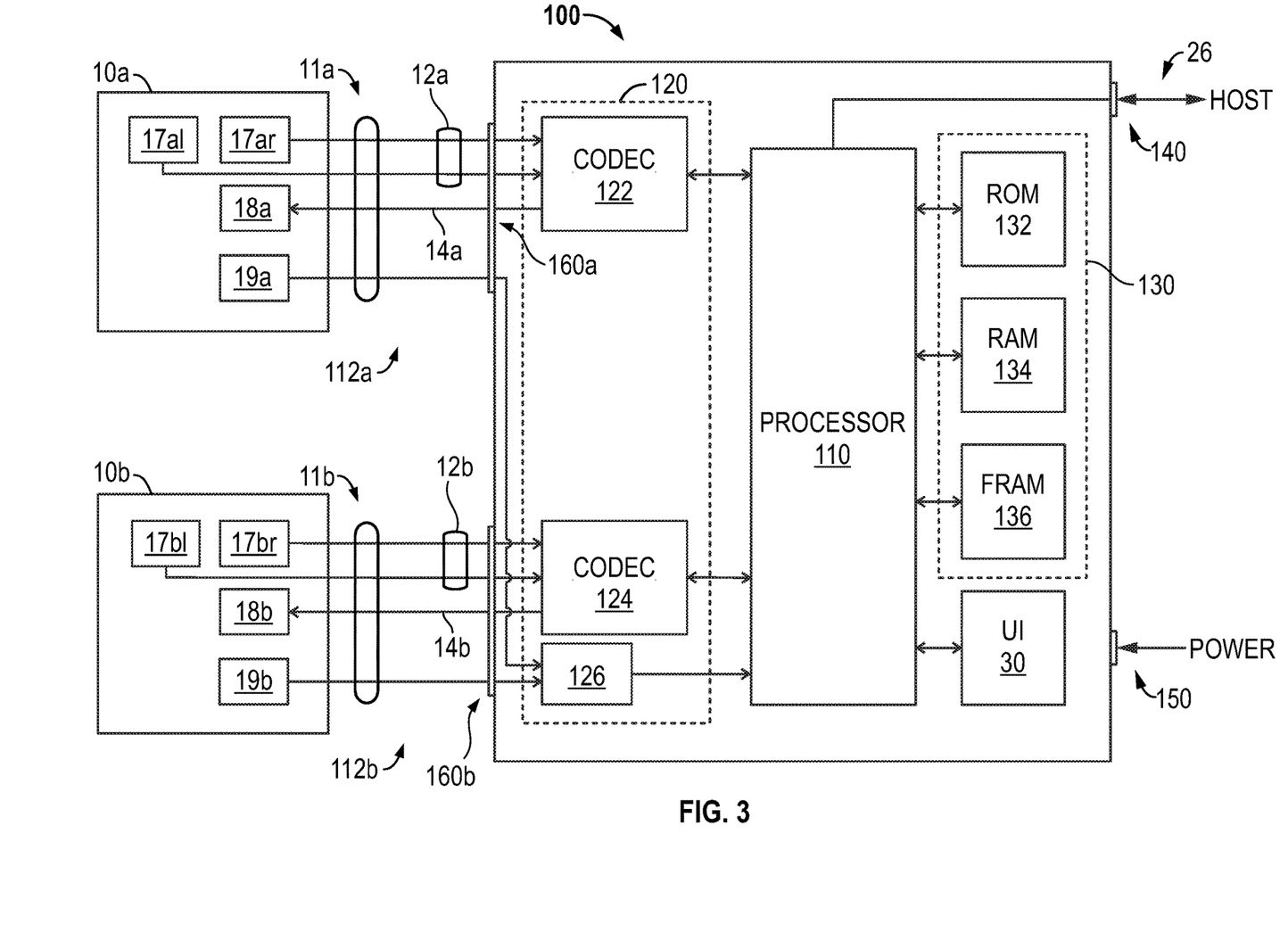
FIG. 3 shows a block diagram of the meter electronics 100 for limiting a drive signal.

FIG. 3 shows a block diagram of the meter electronics 100 for limiting a drive signal. As shown in FIG. 3, the meter electronics 100 is communicatively coupled to the first and second meter assembly 10a, 10b. As described in the foregoing with reference to FIG. 1, the first and second meter assembly 10a, 10b include the first and second left and right pick-off sensors 17a1, 17ar and 17b1, 17br, drive mechanism 18a, 18b, and temperature sensor 19a, 19b, which are communicatively coupled to the meter electronics 100 via the first and second set of leads 11a, 11b through a first and second communication channel 112a, 112b and a first and second I/O port 160a, 160b.

The meter electronics 100 provides a first and second drive signal 14a, 14b via the leads 11a, 11b. More specifically, the meter electronics 100 provides a first drive signal 14a to the first drive mechanism 18a in the first meter assembly 10a. The meter electronics 100 is also configured to provide a second drive signal 14b to the second drive mechanism 18b in the second meter assembly 10b. In addition, a first and second sensor signal 12a, 12b are respectively provided by the first and second meter assembly 10a, 10b. More specifically, in the embodiment shown, the first sensor signal 12a is provided by the first left and right pick-off sensor 17a1, 17ar in the first meter assembly 10a. The second sensor signal 12b is provided by the second left and right pick-off sensor 17b1, 17br in the second meter assembly 10b. As can be appreciated, the first and second sensor signal 12a, 12b are respectively provided to the meter electronics 100 through the first and second communication channel 112a, 112b.

The meter electronics 100 includes a processor 110 communicatively coupled to one or more signal processors 120 and one or more memories 130. The processor 110 is also communicatively coupled to a user interface 30. The processor 110 is communicatively coupled with the host via a communication port 140 over the path 26 and receives electrical power via an electrical power port 150. The processor 110 may be a microprocessor although any suitable processor may be employed. For example, the processor 110 may be comprised of sub-processors, such as a multi-core processor, serial communication ports, peripheral interfaces (e.g., serial peripheral interface), on-chip memory, I/O ports, and/or the like. In these and other embodiments, the processor 110 is configured to perform operations on received and processed signals, such as digitized signals.

The processor 110 may receive digitized sensor signals from the one or more signal processors 120. The processor 110 is also configured to provide information, such as a phase difference, a property of a fluid in the first or second meter assembly 10a, 10b, or the like. The processor 110 may provide the information to the host through the communication port 140. The processor 110 may also be configured to communicate with the one or more memories 130 to receive and/or store information in the one or more memories 130. For example, the processor 110 may receive calibration factors and/or meter assembly zeros (e.g., phase difference when there is zero flow) from the one or more memories 130. Each of the calibration factors and/or meter assembly zeros may respectively be associated with the first and second vibratory sensor 5a, 5b and/or the first and second meter assembly 10a, 10b. The processor 110 may use the calibration factors to process digitized sensor signals received from the one or more signal processors 120.

The one or more signal processors 120 is shown as being comprised of a first and second encoder/decoder (CODEC) 122, 124 and an analog-to-digital converter (ADC) 126. The one or more signal processors 120 may condition analog signals, digitize the conditioned analog signals, and/or provide the digitized signals. The first and second CODEC 122, 124 are configured to receive the left and right sensor signal from the first and second left and right pick-off sensors 17a1, 17ar and 17b1, 17br. The first and second CODEC 122, 124 are also configured to provide the first and second drive signal 14a, 14b to the first and second drive mechanism 18a, 18b. In alternative embodiments, more or fewer signal processors may be employed. For example, a single CODEC may be employed for the first and second sensor signal 12a, 12b and first and second drive signal 14a, 14b. Additionally or alternatively, two ADCs may be employed instead of the single ADC 126.

In the embodiment shown, the one or more memories 130 is comprised of a read-only memory (ROM) 132, random access memory (RAM) 134, and a ferroelectric random-access memory (FRAM) 136. However, in alternative embodiments, the one or more memories 130 may be comprised of more or fewer memories. Additionally or alternatively, the one or more memories 130 may be comprised of different types of memory (e.g., volatile, non-volatile, etc.). For example, a different type of non-volatile memory, such as, for example, erasable programmable read only memory (EPROM), or the like, may be employed instead of the FRAM 136.

As can also be appreciated, although the dual vibratory sensor system 5 shown in FIG. 3 includes only two meter assemblies 10a, 10b, the dual vibratory sensor system 5 may be employed in systems that include more than two meter assemblies. For example, a meter electronics may be configured to communicate with three or more meter assemblies. In such a configuration, the dual vibratory sensor system 5 may be a portion of the meter electronics and two of the three or more meter assemblies.

The meter electronics 100 in the dual vibratory sensor system 5 can provide the first and second drive signal 14a, 14b to the first and second meter assembly 10a, 10b. However, the meter electronics 100 may be required to provide the drive signal to the first and second meter assembly 10a, 10b when the first or second meter assembly 10a, 10b are unable to reach their respective resonance frequency. Additionally or alternatively, the first and second drive signal 14a, 14b may be provided to something other than the first and second meter assembly 10a, 10b. For example, during testing, the first and second drive signal 14a, 14b may be provide to resistors, which may not have a resonance frequency. As a result, the power drawn by the meter electronics 100 may cause the meter electronics 100 to, for example, exceed a threshold, or the like, as the following discussion illustrates.

Drive Signals

Figure 4:
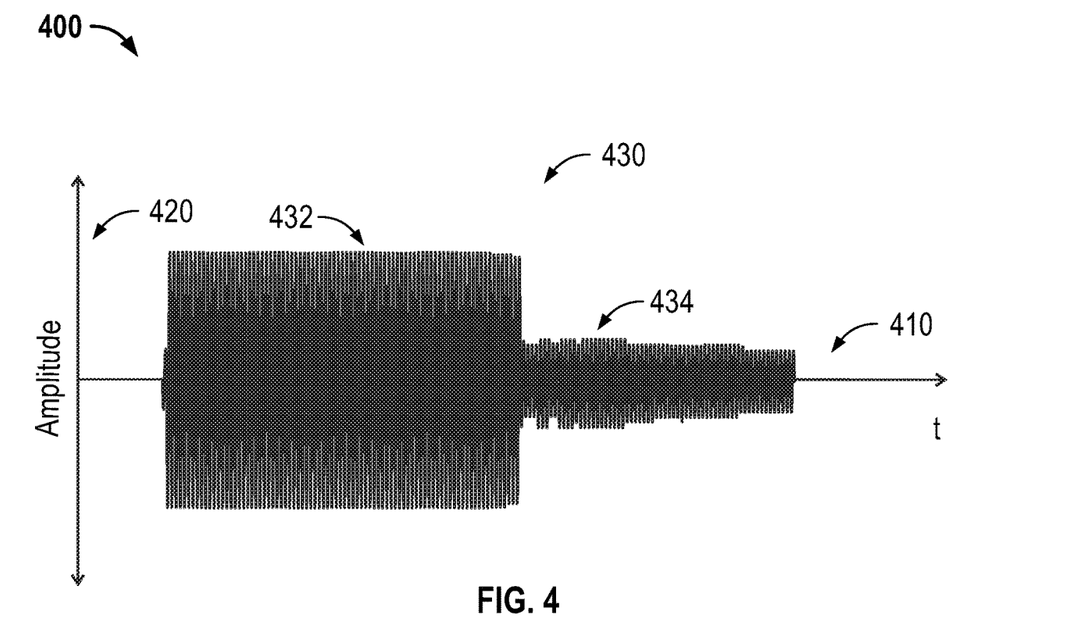
FIG. 4 shows a graph 400 illustrating a drive signal that reaches a resonance frequency of a meter assembly.

FIG. 4 shows a graph 400 illustrating a drive signal that reaches a resonance frequency of a meter assembly. As shown in FIG. 4, the graph 400 includes a time axis 410 and an amplitude axis 420. A first drive signal 430 is plotted along the time axis 410. As can be appreciated, the first drive signal 430 oscillates about the time axis 410 with an amplitude that varies over time. As shown in FIG. 4, the first drive signal 430 includes a non-resonant portion 432 and a resonant portion 434.

The non-resonant portion 432 is shown with a substantially constant amplitude. The frequency of the non-resonant portion 432 varies over time. For example, the non-resonant portion 432 can sweep from a low frequency to a high frequency until the resonance frequency of the meter assembly is reached. When the first drive signal 430 reaches the resonance frequency of the meter assembly, the amplitude of the first drive signal 430 decreases at the resonant portion 434 of the first drive signal 430.

The resonant portion 434 of the first drive signal 430 has an amplitude that is less than the amplitude in the non-resonant portion 432 of the first drive signal 430. As can also be appreciated, the amplitude in the resonant portion 434 of the drive signal 430 varies. The amplitude in the resonant portion 434 may vary due to, for example, properties of the fluid varying. However, due to the drive signal reaching the resonance frequency of the meter assembly, the amplitude of the resonant portion 434 is less than the amplitude of the non-resonant portion 432. The following discussion illustrates a drive signal that does not reach the resonance frequency of the meter assembly.

Figure 5:
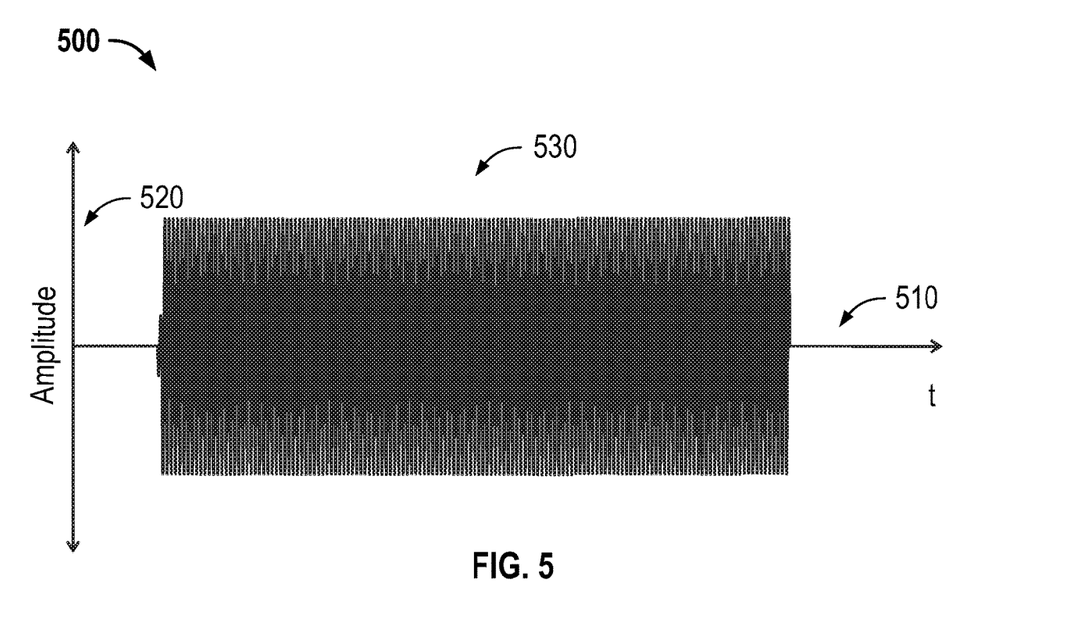
FIG. 5 shows a graph 500 illustrating a drive signal that does not reach a resonance frequency of a meter assembly.

FIG. 5 shows a graph 500 illustrating a drive signal that does not reach a resonance frequency of a meter assembly. As shown in FIG. 5, the graph 500 includes a time axis 510 and an amplitude axis 520. A second drive signal 530 is plotted along the time axis 510. As can be appreciated, the second drive signal 530 oscillates about the time axis 510 with an amplitude that is substantially constant over time. As shown in FIG. 5 and in contrast to the first drive signal 430 shown in FIG. 4, the second drive signal 530 does not include a resonant portion.

Instead of reaching the resonance frequency of the meter assembly, the second drive signal 530 continues to sweep between the high frequency and low frequency at approximately the same amplitude. That is, the amplitude of the drive signal never decreases because the drive signal never reaches the resonance frequency. In addition, the amplitude may be a current that is at or near a maximum current that can be provided by a meter electronics. As a result, the meter electronics, such as the meter electronics 100 described in the foregoing, may have a higher temperature compared to a temperature associated with the first drive signal 430 shown in FIG. 4.

The temperature associated with the second drive signal 530 may be excessive. That is, the temperature may exceed a temperature threshold. For example, protection components, such as current limiting components in the meter electronics, may have power ratings that are de-rated due to temperature variation. The greater the temperature, the lower the power rating of the protection components. In addition, during safety testing, resistors may be employed instead of a meter assembly.

For example, with reference to FIG. 3, the first and second drive signal 14a, 14b may be provided to resistors that are coupled to the first and second I/O port 160a, 160b. The resistors may not have a resonance frequency and, therefore, the first and second drive signal 14a, 14b may appear similar to the second drive signal 530. As can be appreciated, power provided to the meter electronics 100 during safety testing with the resistors may not be the same as the power provided to the meter electronics 100 during operation with the first and second meter assembly 10a, 10b, as the following Table illustrates.

TABLE

| Input power consumption | | |
|---|---|---|
| Drive channel 1 | Drive channel 2 | Input power at 24 VDC |
| First meter assembly 10a | Second meter assembly 10b | 1.7 W |
| 50 mA with resistor load | 50 mA with resistor load | 3.1 W |

The foregoing Table illustrates that when the first and second meter assembly 10a, 10b are coupled to the meter electronics 100, the power provided to the meter electronics 100 is less than the power provided to the meter electronics 100 when the resistors are used.

During the safety testing, the temperature of the meter electronics 100 may reach 70° C. while the ambient temperature is 60° C. At 70° C., power components may have safety power ratings that are the same as or less than the power provided to the meter electronics 100. As a result, the meter electronics 100 may fail the safety test even though the power provided to the meter electronics 100 may be significantly less than the safety power rating when the first and second meter assembly 10a, 10b are employed.

However, a drive signal different than the second drive signal 530 shown in FIG. 5 may be used during the safety testing. For example, the temperature increase that causes the protection components to be de-rated may be avoided by interrupting the second drive signal 530 with a quiescent portion. By interrupting the second drive signal 530, the temperature may not increase to 70° C. As a result, the protection components may be rated at a higher power rating than the power rating associated with 70° C. An exemplary drive signal is discussed in more detail in the following with reference to FIG. 6.

Figure 6:
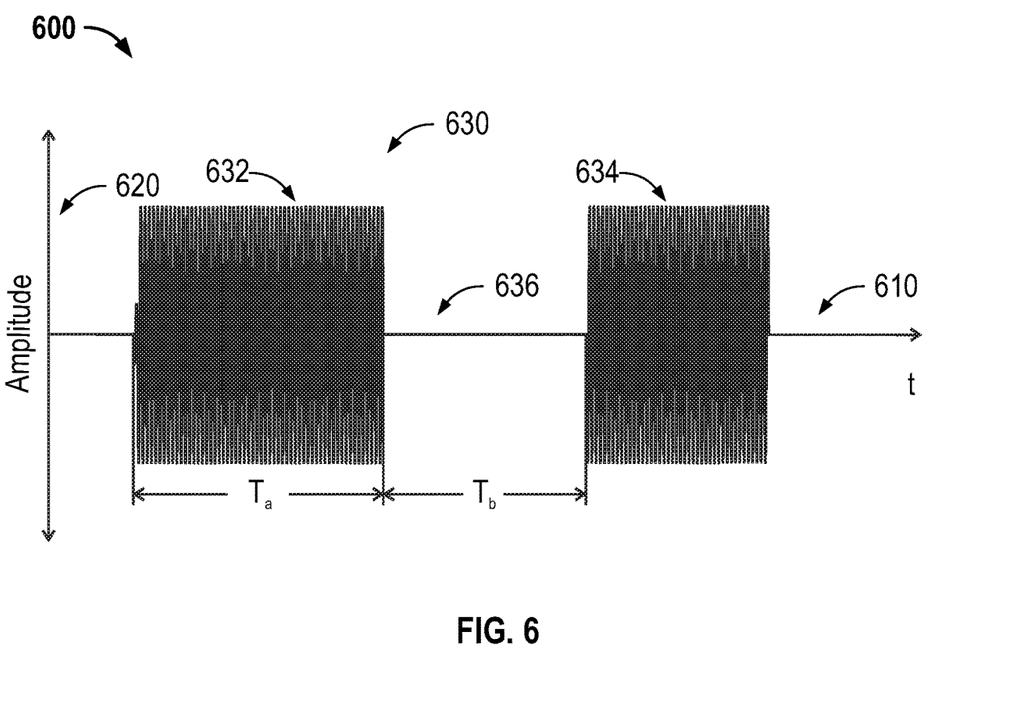
FIG. 6 shows a graph 600 illustrating a drive signal that is interrupted.

FIG. 6 shows a graph 600 illustrating a drive signal that is interrupted. As shown in FIG. 6, the graph 600 includes a time axis 610 and an amplitude axis 620. A third drive signal 630 is plotted along the time axis 610. As can be appreciated, the third drive signal 630 oscillates about the time axis 610 with an amplitude that varies over time. As shown in FIG. 6 and in contrast to the second drive signal 530 shown in FIG. 5, the third drive signal 630 does not include a resonant portion. However, the third drive signal 630 includes a first drive portion 632 and a second drive portion 634. Between the first and second drive portion 632, 634 is a quiescent portion 636.

As shown in FIG. 6, the third drive signal 630 is interrupted after a first drive time-period $T_a$. That is, if the third drive signal 630 does not reach the resonance frequency of the meter assembly within the first drive time-period $T_a$, then the third drive signal 630 is interrupted by the quiescent portion 636. The first drive time-period $T_a$ may be a pre-determined time-period. The first drive time-period $T_a$ may also be based on an expected time for the drive signal to reach the resonance frequency. That is, the first drive time-period $T_a$ may be sufficiently long such that, for example, if the meter assembly is coupled to the meter electronics, then the drive signal will reach the resonance frequency of the meter assembly within the first drive time-period $T_a$.

As shown in FIG. 6, the quiescent portion 636 has a quiescent time-period $T_b$. The quiescent time-period $T_b$ may be selected, for example, such that the temperature of the meter electronics, such as the meter electronics 100 described in the foregoing, does not exceed the temperature threshold. However, the quiescent time-period $T_b$ may be selected based on any appropriate threshold, such as, for example, limiting an average power drawn by the meter electronics, limiting a total current drawn during the first drive time-period $T_a$ and the quiescent time-period $T_b$, or the like. As shown in FIG. 6, the quiescent portion 636 is when the third drive signal 630 is at or near zero. For example, the meter electronics, such as the meter electronics 100 shown in the foregoing, may reduce the third drive signal 630 to at or near zero amps.

Although the third drive signal 630 is described in the foregoing as being interrupted by the quiescent portion 636, the third drive signal 630 may be interrupted by other portions. For example, instead of the quiescent portion 636 where the current is at or near zero amps, the third drive signal 630 may be interrupted by a time-period with a relatively low current (e.g., less than the first drive portion 632). Additionally or alternatively, other time-periods may be employed. For example, the second drive portion 634 may be followed by a second quiescent portion. The second drive portion 634 may also have a different time-period than the first drive portion 632. In these and other embodiments, the drive signal may be provided using various methods, such as the method described in the following with reference to FIG. 7.

Method

Figure 7:
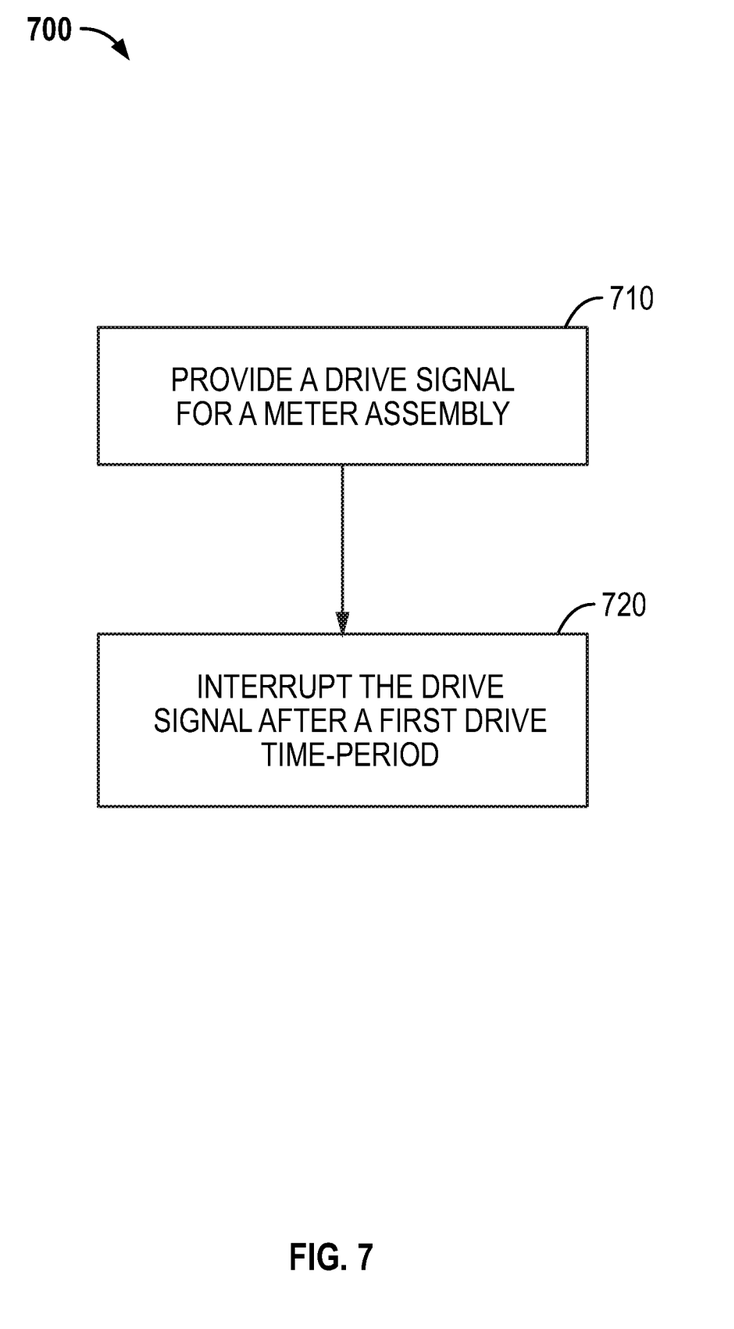
FIG. 7 shows a method 700 of providing a drive signal.

FIG. 7 shows a method 700 of providing a drive signal. As shown in FIG. 7, the method 700 begins by providing a drive signal for a meter assembly. The meter assembly may have a resonance frequency. The drive signal may be provided by a meter electronics, such as, for example, the meter electronics 100 described in the foregoing. In step 720, the method 700 interrupts the drive signal after a first drive time-period. The first drive time-period may be based on an expected time for the first drive signal to reach the resonance frequency.

In step 710, the method 700 may provide the drive signal for the meter assembly during operation, testing, or any other suitable process. For example, the method 700 may cause the meter electronics 100 described in the foregoing to provide the first and second drive signal 14a, 14b for the first and second meter assembly 10a, 10b during testing, when resistors are coupled to the first and second I/O port 160a, 160b. Accordingly, the drive signal, although provided for the first and second meter assembly 10a, 10b, may be provided to the resistors. During the testing, operation, or other suitable process, the drive signal provided by the meter electronics 100 may be the third drive signal 630, which includes the first and second drive portion 632, 634, or any other suitable drive signal that is interrupted.

In step 720, the method 700 may interrupt the drive signal after the first drive time-period, such as the first drive time-period $T_a$ described in the foregoing with reference to FIG. 6. After the first drive time-period $T_a$, the third drive signal 630 is interrupted by the quiescent portion 636. The first drive time-period $T_a$ may be based on the expected time for the third drive signal 630 to reach a resonance frequency. For example, during design, calibration, or the like, the time for the third drive signal 630 to reach the resonance frequency may be about 16 seconds, although any suitable expected time may be employed.

The first drive time-period $T_a$ may also be based on a threshold. For example, the first drive time-period $T_a$ may be less than a time required for the meter electronics 100 to reach a temperature threshold, such as 70° C. discussed in the foregoing. However, other thresholds may be employed, such as, for example, an average power threshold of power drawn by the meter electronics 100, total current threshold of the current drawn during the first drive time-period $T_a$ and the quiescent time-period $T_b$, or the like. Accordingly, the first drive time-period $T_a$ may be greater than the time required for the first or second meter assembly 10a, 10b to reach their respective resonance frequency and less than the time required for the meter electronics 100 to reach the threshold.

The first drive time-period $T_a$ may be determined using any suitable process, such as a single or multiple measurements of the time and/or thresholds, simulation results, etc. For example, during calibration, the first drive signal 430 may be provided to the first or second meter assembly 10a, 10b. The time required for the first or second meter assembly 10a, 10b to reach their respective resonance frequency may be stored in the one or more memories 130 in the meter electronics 100. Additionally or alternatively, the meter electronics 100 may provide the second drive signal 530 to the resistors coupled to the first and second I/O port 160a, 160b during safety testing. The time required to reach the threshold may also be stored in the one or more memories 130.

During, for example, operation, the meter electronics 100 may provide the third drive signal 630 to the first and/or second meter assembly 10a, 10b. The first drive time-period $T_a$ is more than the time required for the first and/or second meter assembly 10a, 10b to reach their respective resonance frequency and is less than the time required for the meter electronics 100 to reach the threshold. As a result, the meter electronics 100 is able to drive the first and second meter assembly 10a, 10b without, for example, increasing the temperature to 70° C. even if the drive signal does not reach the resonance frequency of the first and second meter assembly 10a, 10b.

As can be appreciated, once the drive signal reaches the resonance frequency of the meter assembly, the drive signal may not be interrupted. More specifically, with reference to the embodiments described in the foregoing, although the meter electronics 100 may provide the third drive signal 630 to the first and/or second meter assembly 10a, 10b, the third drive signal 630 may reach the resonance frequency of the first and/or second meter assembly 10a, 10b within the first drive time-period $T_a$. The meter electronics 100 may detect that the third drive signal 630 reached the resonance frequency within the first drive time-period $T_a$. Accordingly, the meter electronics 100 does not interrupt the third drive signal 630 with the quiescent portion 636 as shown in FIG. 6. Instead, the meter electronics 100 continues to provide a drive signal that may be similar to the first drive signal 430 shown in FIG. 4.

The embodiments described above provide the dual vibratory sensor system 5 and method 700 for providing a drive signal. The dual vibratory sensor system 5 and method 700 may provide a drive signal, such as the third drive signal 630, to the first and second meter assembly 10a, 10b and interrupt the drive signal to, for example, ensure that the temperature of the meter electronics 100 does not exceed the temperature threshold. By not exceeding the temperature threshold, the same protection components, such as the same clamp diode, may be employed for different configurations of the dual vibratory sensor system 5. This can reduce the costs associated with the alternative designs to support different configurations of the dual vibratory sensor system 5, more expensive protection components, etc. For example, a single design with the protection components may be employed when the dual vibratory sensor system 5 includes only one or both of the first and second meter assembly 10a, 10b.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other systems and methods for limiting a drive signal and not just to the embodiments described above and shown in the accompanying figures. Accordingly, the scope of the embodiments described above should be determined from the following claims.

We claim:

1. A method of limiting a drive signal, the method comprising:
   providing a drive signal for a meter assembly, wherein the meter assembly has a resonance frequency; and
   interrupting the drive signal after a first drive time-period, wherein the first drive time-period is based on an expected time for the drive signal to reach the resonance frequency.

2. The method of claim 1, wherein the first drive time-period is a pre-determined time-period based on the expected time for the drive signal to reach the resonance frequency.

3. The method of claim 1, wherein interrupting the drive signal comprises interrupting the drive signal with a quiescent portion.

4. The method of claim 1, further comprising providing the drive signal for the meter assembly after the first drive time-period.

5. The method of claim 1, wherein providing the drive signal comprises sweeping a frequency of the drive signal over a range that includes the resonance frequency.

6. A meter electronics (100) for limiting a drive signal, the meter electronics (100) comprising:
   a processor (110); and
   one or more signal processors (120) communicatively coupled to the processor (110), wherein the one or more signal processors (120) are configured to:

provide a drive signal for a meter assembly (10a, 10b), wherein the meter assembly (10a, 10b) has a resonance frequency; and interrupt the drive signal after a first drive time-period ($T_a$), wherein the first drive time-period ($T_a$) is based on an expected time for the drive signal to reach the resonance frequency.

7. The meter electronics (100) of claim 6, wherein the first drive time-period ($T_a$) is a pre-determined time-period based on the expected time for the drive signal to reach the resonance frequency.

8. The meter electronics (100) of claim 6, wherein the one or more signal processors (120) being configured to interrupt the drive signal comprises the one or more signal processors (120) being configured to interrupt the drive signal with a quiescent time-period ($T_b$).

9. The meter electronics (100) of claim 6, wherein the one or more signal processors (120) are further configured to provide the drive signal for the meter assembly (10a, 10b) after the first drive time-period ($T_a$).

10. The meter electronics (100) of claim 6, wherein the one or more signal processors (120) being configured to provide the drive signal comprises the one or more signal processors (120) being configured to sweep a frequency of the drive signal over a range that includes the resonance frequency.

11. A dual vibratory sensor system (5) for limiting a drive signal, the dual vibratory sensor system (5) comprising:
a first meter assembly (10a); and
a meter electronics (100) coupled to the first meter assembly (10a), the meter electronics (100) being configured to:
provide a drive signal for the first meter assembly (10a), wherein the first meter assembly (10a) has a resonance frequency; and
interrupt the drive signal after a first drive time-period ($T_a$), wherein the first drive time-period ($T_a$) is based on an expected time for the drive signal to reach the resonance frequency.

12. The dual vibratory sensor system (5) of claim 11, wherein the first drive time-period ($T_a$) is a pre-determined time-period based on the expected time for the drive signal to reach the resonance frequency.

13. The dual vibratory sensor system (5) of claim 11, wherein the meter electronics (100) being configured to interrupt the drive signal comprises the meter electronics (100) being configured to interrupt the drive signal with a quiescent time-period ($T_b$).

14. The dual vibratory sensor system (5) of claim 11, wherein the meter electronics (100) is further configured to provide the drive signal for the first meter assembly (10a) after the first drive time-period ($T_a$).

15. The dual vibratory sensor system (5) of claim 11, wherein the meter electronics (100) being configured to provide the drive signal comprises the meter electronics (100) being configured to sweep a frequency of the drive signal over a range that includes the resonance frequency.

16. The dual vibratory sensor system (5) of claim 11, further comprising a second meter assembly (10b), wherein the meter electronics (100) is coupled to the second meter assembly (10b).

* * * * *